United States Patent [19]
Hobelsberger

[11] Patent Number: 6,016,704
[45] Date of Patent: Jan. 25, 2000

[54] ELECTROMECHANIC TRANSDUCER WITH INTEGRATED PRESSURE SENSOR

[76] Inventor: Maximilian Hans Hobelsberger, Wuerenlingen Dorfstr., Wuerenlingen CH-5303, Switzerland

[21] Appl. No.: 09/042,679

[22] Filed: Mar. 15, 1998

Related U.S. Application Data

[60] Provisional application No. 60/041,240, Mar. 24, 1997.
[51] Int. Cl.$^7$ .......................................................... G01L 9/04
[52] U.S. Cl. ................................................ 73/720; 73/702
[58] Field of Search .............................. 73/715, 719, 720, 73/721, 722, 702, 726, 727

[56] References Cited

U.S. PATENT DOCUMENTS

| | | | |
|---|---|---|---|
| 3,689,875 | 9/1972 | Kostelnicek | 340/17 |
| 4,584,879 | 4/1986 | Webster et al. | 73/588 |
| 4,685,465 | 8/1987 | Klitgaard et al. | 128/635 |
| 5,218,972 | 6/1993 | Gorsuch et al. | 73/721 |
| 5,317,921 | 6/1994 | Kremidas | 73/721 |
| 5,438,876 | 8/1995 | Lewis | 73/721 |
| 5,637,905 | 6/1997 | Carr et al. | 73/722 |

*Primary Examiner*—Max Noori

[57] ABSTRACT

A thin, flexible foil acts as the membrane of the transducer. It is circumferentially connected to a rigid support structure which connects the foil mechanically with the transducer's driving coil. The foil is equipped with strain sensors which indicate the pressure upon the foil.

12 Claims, 6 Drawing Sheets

ELECTROMECHANIC TRANSDUCER WITH INTEGRATED PRESSURE SENSOR

This application claims the benefit of U.S. Provisional Application Ser. No. 60/041,240 filed Mar. 24, 1997.

DESCRIPTION

In some systems which are employed for acoustical sound reproduction sensors are used to measure the produced sound pressure or a gas pressure inside a chamber. In these systems the pressure is produced or influenced by electromechanic transducers, usually of the moving coil type. The signals generated by the pressure sensors are forwarded to closed loop control circuits which control the pressure produced by the electromechanic transducers.

Often these sensors consist of a piezoelectric material and they are placed at a certain distance from the sound- or pressure producing membrane of the transducer If these sensors are attached to the moving membrane the acceleration is measured rather than the pressure because of the weight and the resulting inertia of the sensor material. If the sensors are placed apart from the membrane the resulting dead times, i. e. the time delays in the measurement, impede the proper working of the closed loop control circuits. In addition the sensors, which are attached to the membrane, are relatively small in comparison to the surface of the membrane and so they measure the value just at a certain point of the membrane rather than to give information about an overall value of the whole surface.

Some solutions exist for an advantageous placement of the pressure sensors and for their shape. According to Hobelsberger, UK Pat. GB 2,264,208, piezoelectric sensors are attached directly to the membrane. However bending and stretching of the main membrane will generate distortions of the signals if no special care is taken.

The invention according to the claims allows a direct measurement of the pressure at the transducer's membrane without distortions due to bending or stretching.

According to FIG. 1 a thin, light, flexible film, usually made of polymers, is connected at its outer, circumferential edge to a rigid support structure. The foil is equipped with strain sensors, e.g. made of piezoelectric or piezoresistive material, which produce electrical signals if mechanical tension exists within to the foil. The support structure, made of e.g. rigid plastics, connects the circumferential edge of the foil with the electrical driving coil of the transducer. By springs or other elastic means the foil is mechanically stretched and preloaded so that it does not fall loose. This foil acts as the transducer's membrane when the whole structure is moved by the electrical driving coil. The mechanical preloading by elastic means ensures to keep the shape of the foil when air-pressure forces act upon the foil.

This foil acts as the membrane of the transducer, or at least as part of the membrane. The foil is equipped with conducting electrodes which pick up the electrical signals generated by the piezo-effective (piezoelectric or piezoresistive) material when mechanical tension is applied to the foil. So if air pressure acts upon the foil and strain is developped, electrical signals are generated which are indicative of the pressure or the pressure changes upon the foil.

A preferred material for the foil is PVDF or other piezoelectric polymers. However foils which change their resistance or other electrical characteristics if strained can be used as well.

For a fuller understanding of the nature of the invention, reference should be made to the following detailed description of the preferred embodiments of the invention, considered together with the accompanying drawings.

DESCRIPTION OF THE PREFERRED EMBODIMENTS

Figure 1:
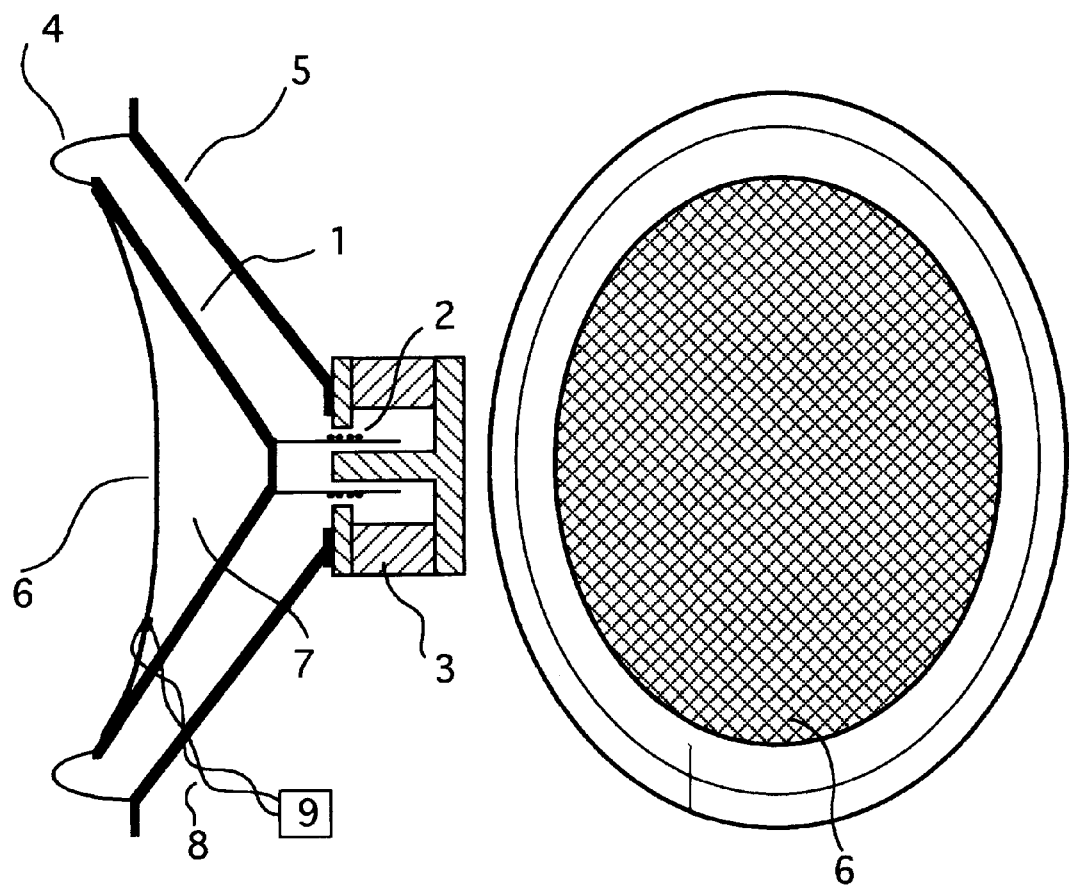
FIG. 1 is a schematic view of a system that is a preferred embodiment of the present invention.

The following is a description of a first embodiment of the invention and refers to FIG. 1.

The whole structure is similar to the usual electrodynamic cone loudspeaker. The transducer's rigid support structure 1 is connected with the driving coil 2. This coil sits in the gap of a magnet circuit 3 and moves when electrical current is applied to it. The support structure 1 has the shape of a concave, closed basket, similar to a conventional cone loudspeaker's membrane. This support structure is connected by flexible materials 4 at its circumferential edge to the transducer's outer rigid basket 5.

More or less close to the outer, circumferential edge of the support structure 1 a thin, flexible foil 6 is connected at its outer circumferential edge to the support structure. This connection is airtight which can be achieved by e.g. glueing.

The foil consists, at least partly, of polyvinyliden-fluoride, PVDF, a piezoelectric polymer. Thin layers of conducting material, i.e. metalizations, are applied to both surfaces of the piezoelectric parts of the foil to form electrodes. These electrodes pick up the electrical signals generated by the piezoelectric foil if tension is applied to the foil which generates strain within the foil. The signals are further transferred via flexible leads 8 to an electronic circuit 9, e.g. a charge amplifiers which process the signals. The strain occurs when the air pressure at the outer surface of the foil differs from the air pressure at the foil's inner surface, i.e. in the chamber 7 between foil and support structure. This is the case when the outer pressure changes and if the chamber 7 is sufficiently airtight in respect of the outer space to which the outer surface of the mebrane adjoins. Then the inner pressure in this chamber 7 does not change as quickly as the outer pressure at the outer surface of the foil.

So the foil acts as pressure sensor which generates electrical signals indicative of pressure changes upon the foil. And in addition it acts as the transducers membrane. Time delays of measurement are avoided and, because the flexible mebrane is attached to the support structure only at its edge, deformations of the support structure have only reduced influence upon the pressure measurement.

Figure 6:
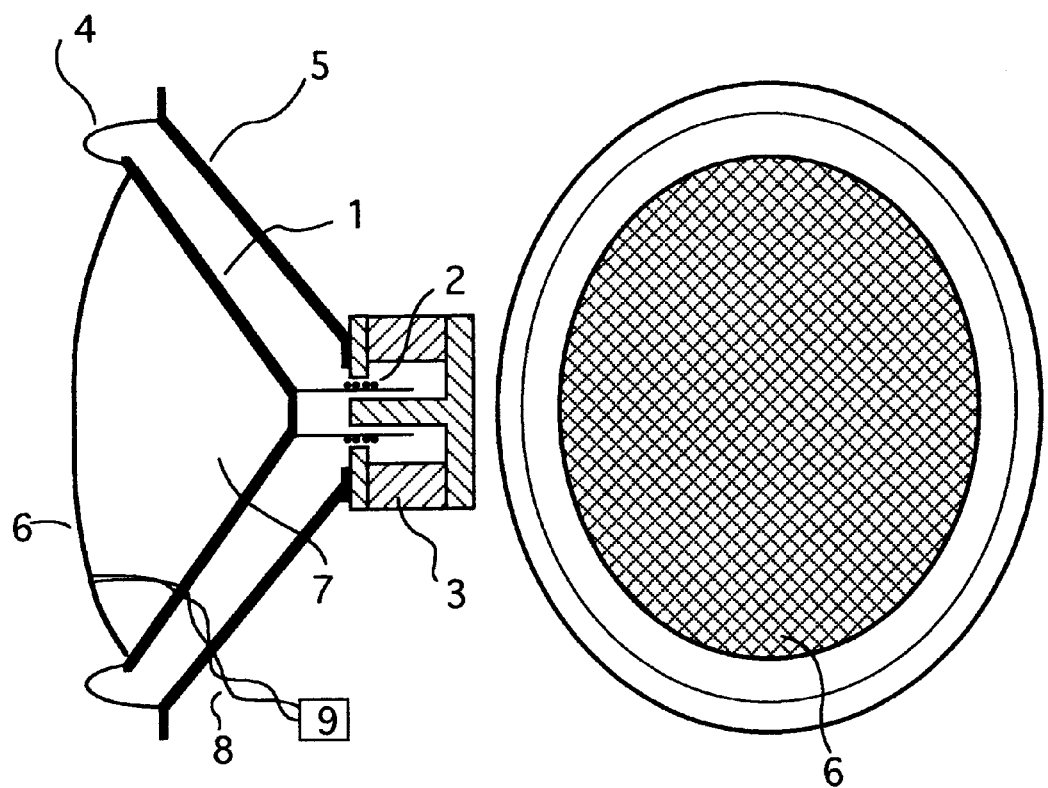
FIG. 6 shows a sixth embodiment of the invention.

In FIG. 1 the chamber 7 is completely airtight and sealed. The pressure in the chamber 7 is reduced in comparison to the pressure outside the chamber to create a pressure difference. This pressure difference creates the mechanical preloading of the foil. However the pressure in 7 could be increased too in comparison to the external pressure. This device is shown in FIG. 6.

It should be noted that the foil can be a composite structure consisting of a net of mechanically strong fibers which give mechanical strength, with the relativly weak piezo-effective foil arranged in the mashes.

Figure 2:
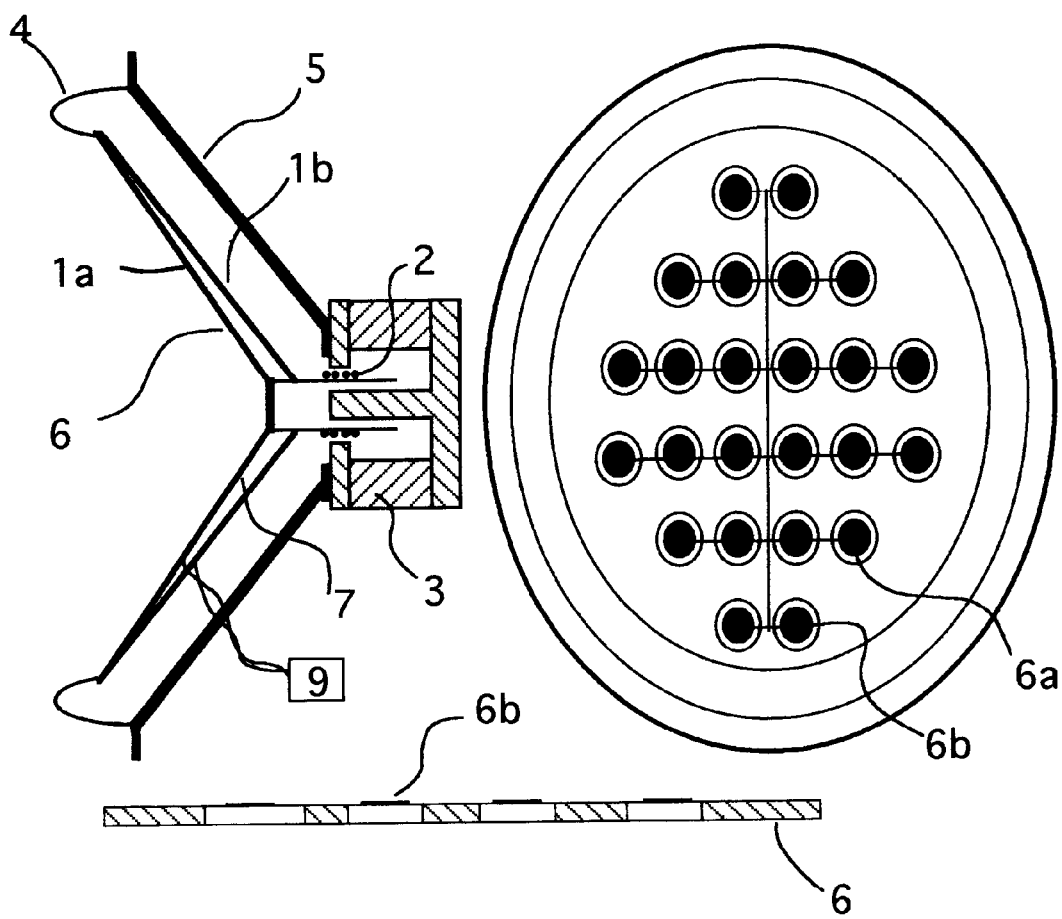
FIG. 2 shows a second embodiment.

FIG. 2 shows a similar device where the foil 6 consists of several segments 6a which are each connected at their circumferential edges to the support structure 1a. Again the support structure 1a is shaped like a conventional loudspeakers membrane, however it is equipped with a multitude of e.g. round openings. Each opening is covered and closed with the foil 6a. The electrodes 6b are arranged in distance from the edge to further decrease distortions due to bending. So bending and deformations of the support structure has only little influence on the pressure measurement. A rigid back structure 1b is part of the support structure and creates an airtight chamber 7 with low air pressure for mechanical preloading of the foil. However this backstructure could be omitted if the foil is already stretched and preloaded when it is glued or bonded to the support structure 1a. The other elements are the flexible connection 4, the basket 5, the magnet system 3, the coil 2, the signal leads 8, the processing electronics 9.

Figure 3:
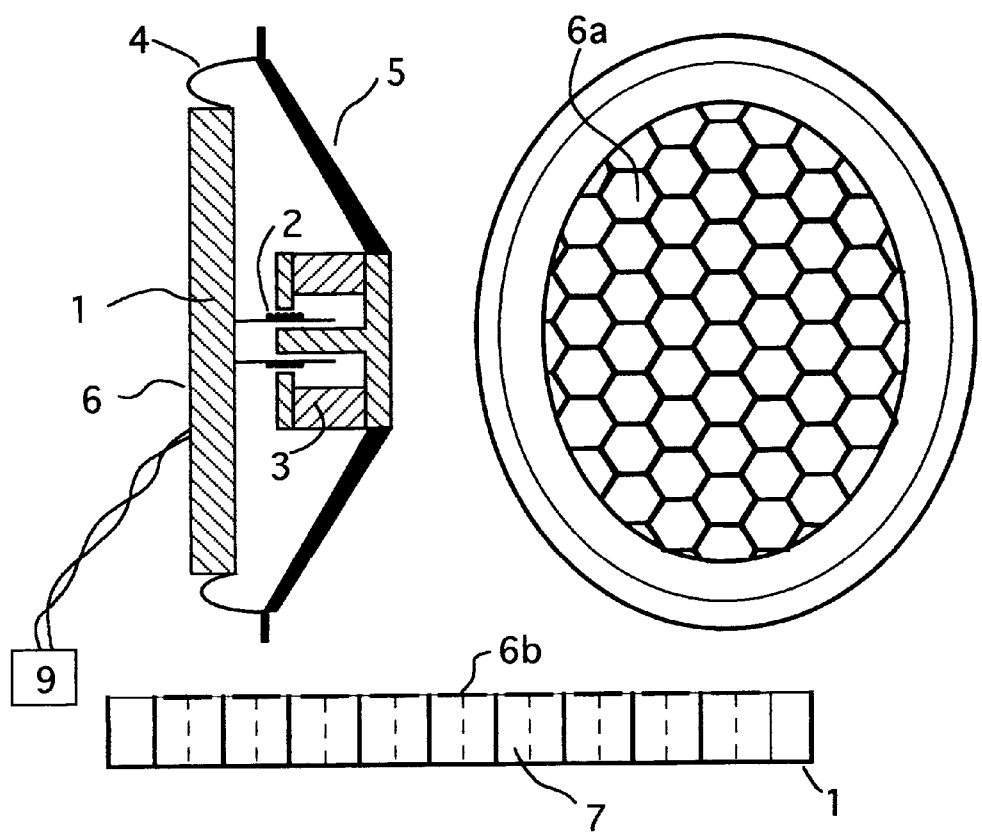
FIG. 3 shows a third embodiment of the invention.

FIG. 3 shows a support structure 1 consisting of a multitude of honeycomb elements. This support structure is flat, however it could have other shapes too. One side is sealed with the pressure sensitive foil 6 forming segments 6a the other surface with a stiffening material. The electrodes 6b are attached in certain distance from the segment's edges to further reduce distortions due to bending. However the whole surface can be uniformly covered too. Again the pressure within the inner chambers 7 is reduced or increased relatively to the outer pressure to produce a mechanical preloading of the foil. In addition this preloading stiffens the whole structure. In case of higher inner pressure the whole structure could consist of flexible foil. The other elements are the flexible connection 4, the basket 5, the magnet system 3, the coil 2, the signal leads 8, the processing electronics 9.

Figure 4:
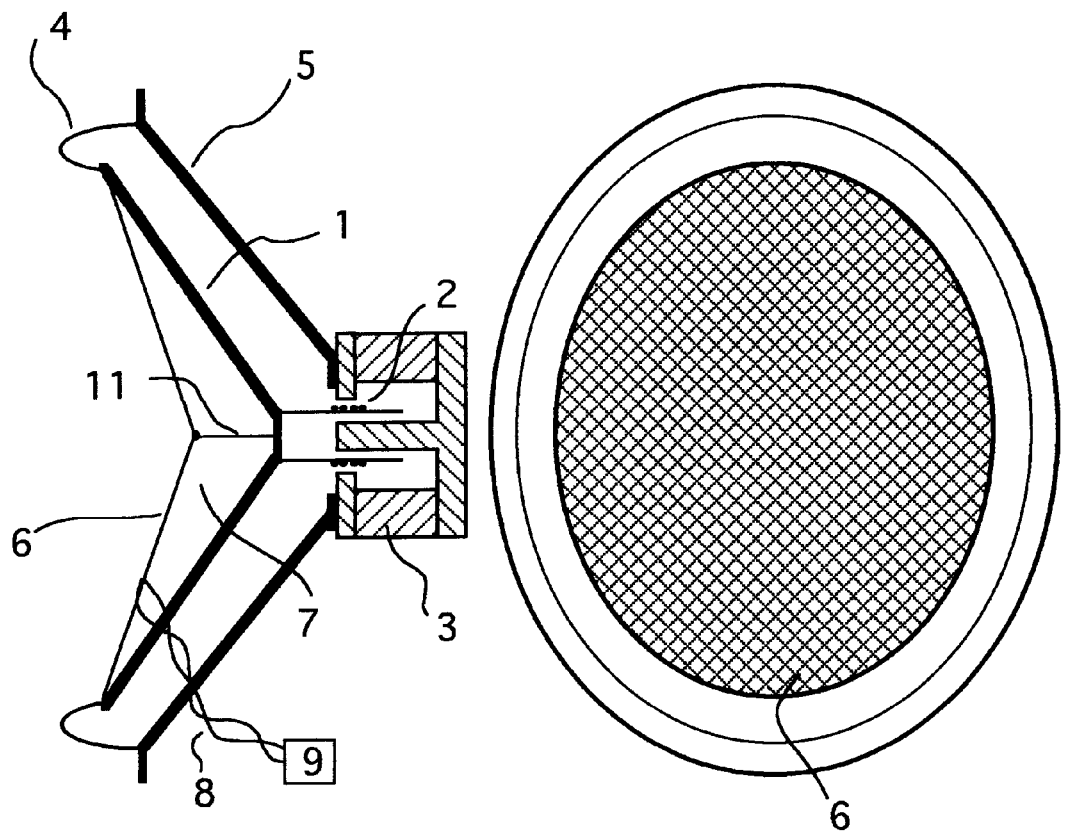
FIG. 4 shows a fourth embodiment of the invention.

FIG. 4 shows almost the same device figure as FIG. 1. However the mechanical preloading of the foil is achieved by connecting the foil and the support structure by elastical means 11, e.g.a spring made of e.g. rubber. The other elements are the flexible connection 4, the basket 5, the magnet system 3, the coil 2, the signal leads 8, the processing electronics 9.

Figure 5:
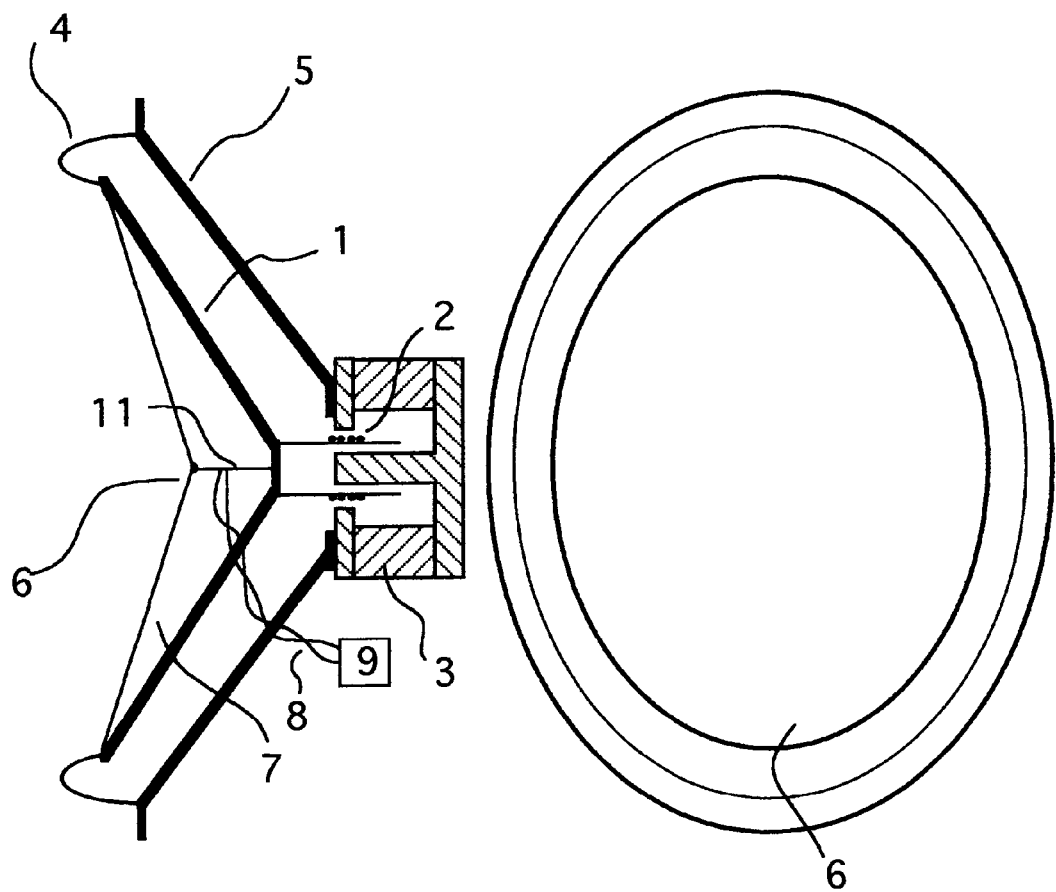
FIG. 5 shows a fifth embodiment of the invention.

FIG. 5 shows a variation of the device of FIG. 4. In this case the piezo sensor is attached to the elastic preloading means 11. It measures changes of the strain within this element.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications in dimensions, flexibility of the foil, rigidy of the support structure, shapes, preloading mechanisms etc. which come within the true spirit and scope of this invention.

What is claimed is:

1. Method for influencing the air pressure in acoustical systems and for measuring the air pressure at the membrane of the transducer, comprising the steps of
   a) providing a support structure which is substantially rigid,
   b) providing a membrane which is mechanically connected to said support structure, whereby at least parts of said membrane do not touch said support structure,
   c) moving said membrane with driving means which are mechanically connected to said support structure,
   d) measuring the mechanical tension within said membrane with strain sensing means which produce signals indicative of said mechanical tension.

2. Electromechanic transducer with integrated pressure sensor for influencing air pressure in acoustical systems, comprising
   a) a support structure which is substantially rigid,
   b) driving means mechanically connected to said support structure for moving said support structure,
   c) a membrane mechanically connected to said support structure, whereby at least parts of said membrane do not touch said support structure,
   d) strain sensing means for sensing mechanical tension within said membrane and for producing signals indicative of mechanical tension within said membrane.

3. Transducer according to claim 2, wherein said membrane consists at least partially of piezoeffective foil, and wherein said piezoeffective foil is equipped with a plularity of electrodes, such that said electrodes together with said piezoeffective foil constitute said strain sensing means.

4. Transducer according to claim 3, wherein said piezoeffective foil consists of polyvinylidenfluoride.

5. Transducer according to claim 3, wherein said membrane consists almost completely of said piezoeffective foil.

6. Transducer according to claim 2, wherein said membrane and said support structure enclose at least one substantially airtight chamber.

7. Transducer according to claim 6, wherein the air pressure within said chamber differs from the air pressure outside said chamber such that a mechanical preloading of said membrane is achieved.

8. Transducer according to claim 6, further including elastical means mechanically connecting said membrane and said support structure for mechanically preloading said membrane.

9. Transducer according to claim 8, wherein said strain sensing means are attached to said elastical means.

10. Transducer according to claim 6, wherein the support structure consists of a multitude of honeycomb elements, which are closed at one side by said membrane.

11. Transducer according to claim 6, wherein said support structure is a member with the shape of a concave basket, and wherein said membrane is attached at its circumferential edge to said basket.

12. Transducer according to claim 3, wherein said foil is a composite structure consisting of a net of mechanically strong fibers with the piezoeffective foil being arranged in the mashes of said net.

\* \* \* \* \*